Aug. 16, 1966 L. J. BUDD 3,266,444
SLIDING ADJUSTABLE PALLET
Filed Dec. 17, 1962 3 Sheets-Sheet 1
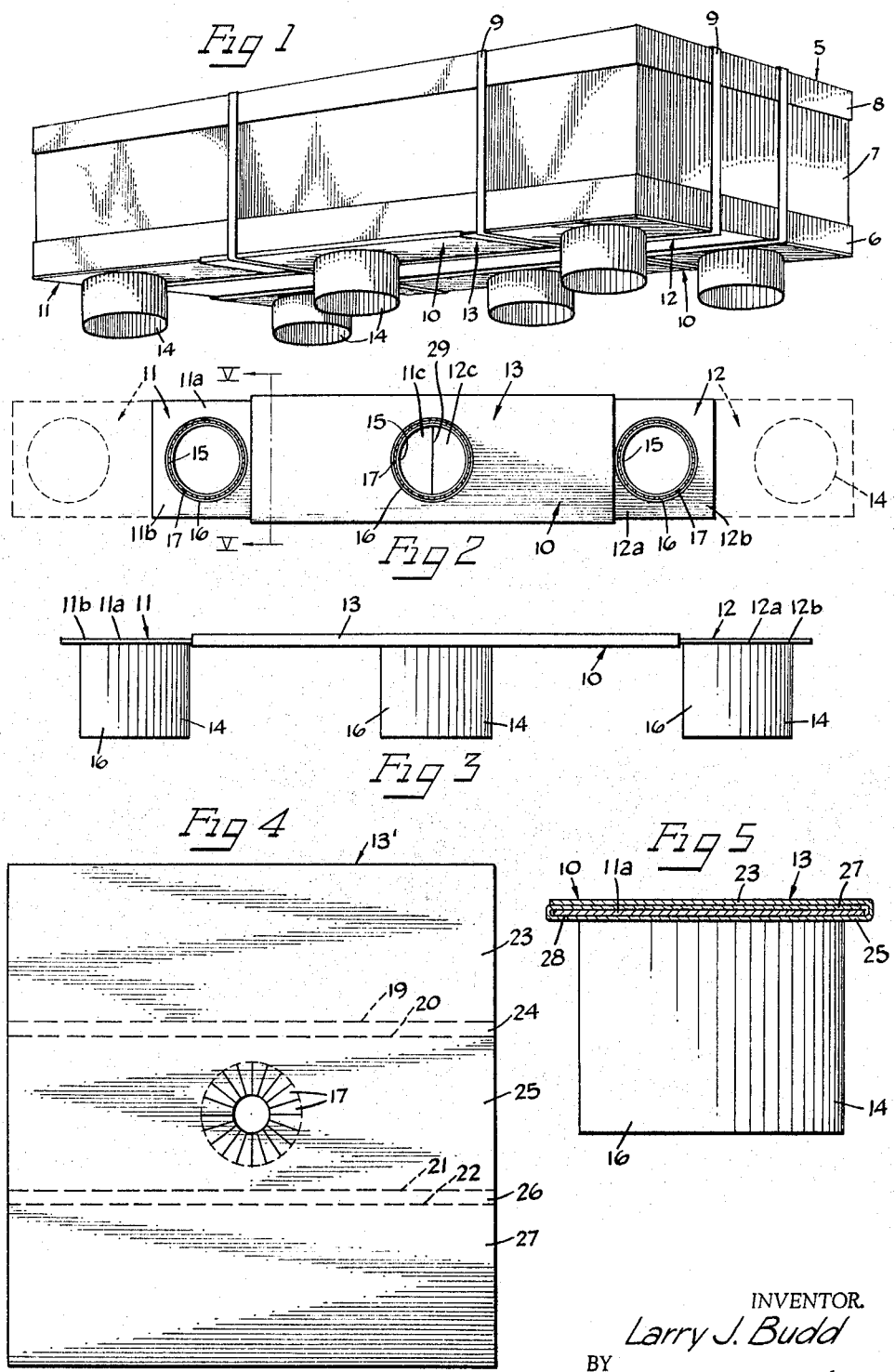
INVENTOR.
Larry J. Budd
BY
ATTORNEYS Aug. 16, 1966  L. J. BUDD  3,266,444
SLIDING ADJUSTABLE PALLET
Filed Dec. 17, 1962  3 Sheets-Sheet 2
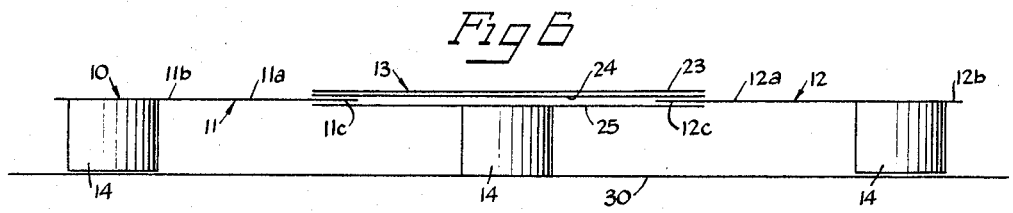
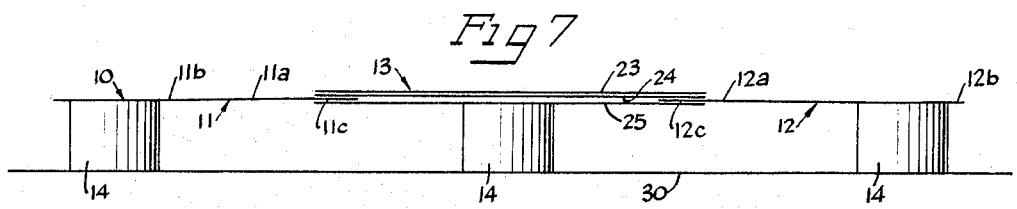
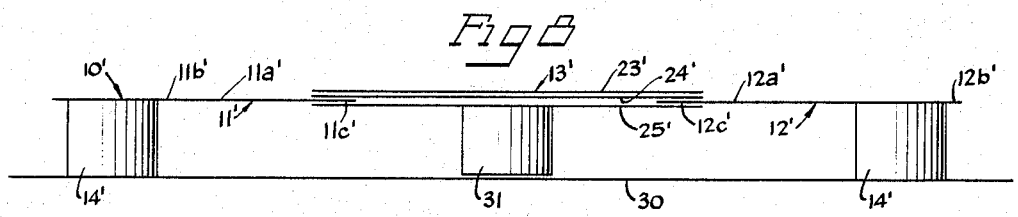
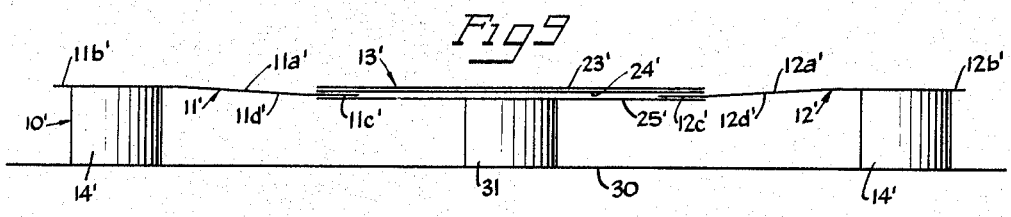
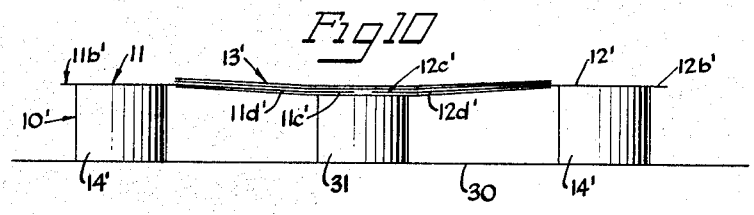
INVENTOR.
Larry J. Budd
BY
ATTORNEYS

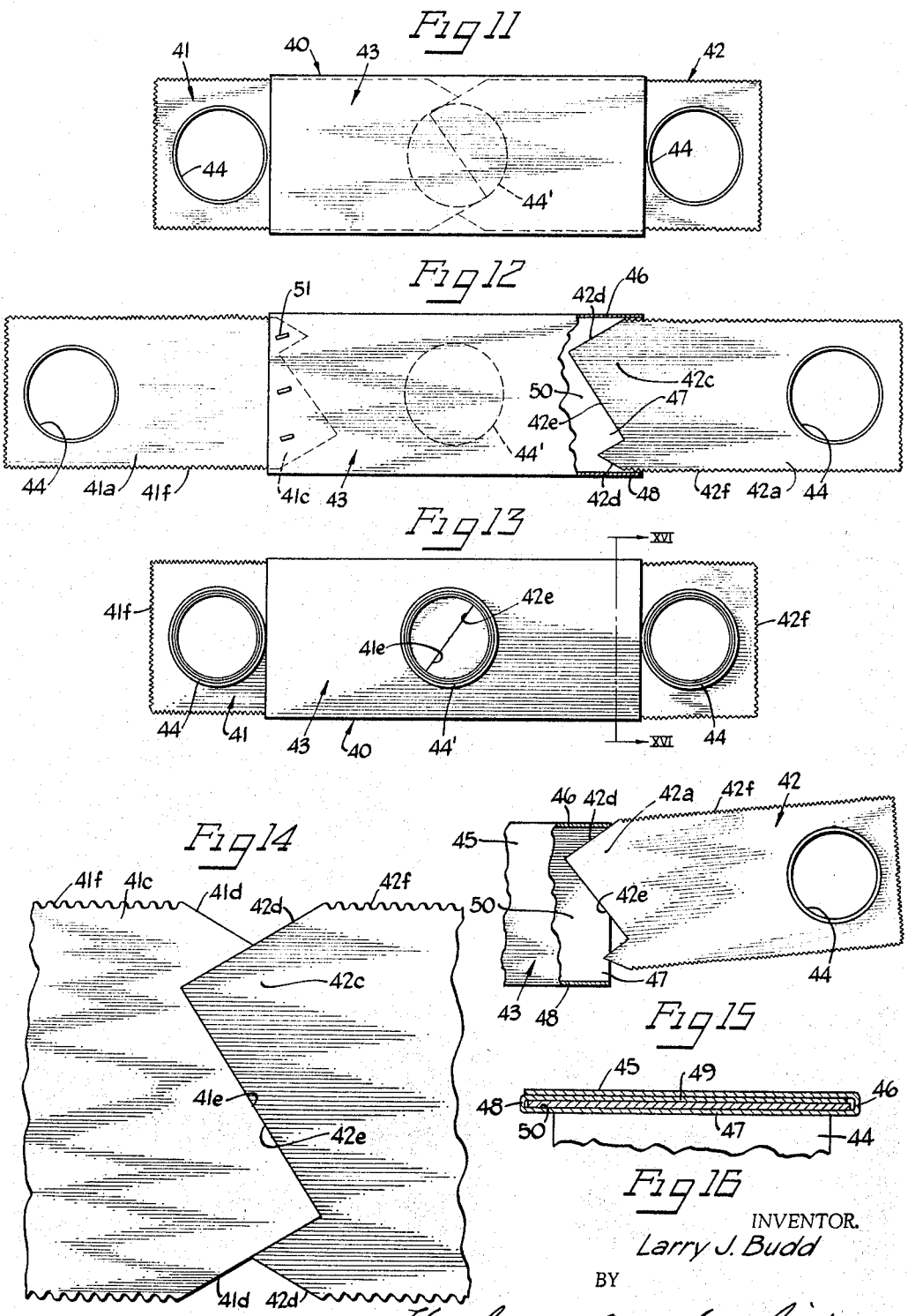

United States Patent Office 3,266,444
Patented August 16, 1966

1

3,266,444
SLIDING ADJUSTABLE PALLET
Larry J. Budd, Elmhurst, Ill., assignor to Pallet Devices Incorporated, Des Plaines, Ill., a corporation of Illinois
Filed Dec. 17, 1962, Ser. No. 245,283
37 Claims. (Cl. 108—54)

The present application constitutes a continuation-in-part of my earlier filed application entitled Sliding Adjustable Pallet, Ser. No. 228,081, filed Oct. 3, 1962.

The present invention relates generally to a sliding adjustable pallet and method of making the same. In the past, many different types of paperboard and wooden legs have been used for palletizing articles such as corrugated boxes having parts therein. In the manufacture of these paperboard and wooden pallets it is of the utmost importance that the manufacturing cost be as low as possible in order that the pallet may be competitively sold.

The present invention is concerned with a new type of expandible pallet which can be manufactured at a very reduced price as compared to prior types of paperboard and wooden pallets commonly employed in the packaging industry. One reason for the cost reduction is that the overall amount of material in each pallet is reduced and further since the pallet may be shipped in a very economical manner. Still another reason for the cost reduction is that by manufacturing an expandible type pallet, as disclosed herein, it is no longer necessary to custom make each pallet for the particular carton for which it is to be used as the expandible pallet can be used with cartons of various sizes.

An important feature of the present invention relates to the pallet being comprised of a series of telescoped pallet sections which enable the length of the pallet to be varied to fit the particular carton to which it is to be attached.

According to other features of this invention, a carton can be palletized by attaching a series of the expandible pallets or units to an underside of the carton by any suitable means such as by straps, glue and the like.

An important object of this invention is to provide an expandible pallet adapted for use with cartons of different sizes.

Still another important object of this invention is to provide an expandible pallet which can be economically manufactured and shipped to the packager.

According to important features of this invention an expandible paperboard pallet is provided, which pallet is comprised of a series of sections having means for securing the sections in slidable assembly together and with pallet legs being attached to one side of these sections.

According to still further features of this invention, the pallet is comprised of three sections with the center section being tubular and with the end sections being telescoped within the tube in slidable assembly therewith.

It is still another important object of this invention to provide new and improved methods for manufacturing an expandible paperboard pallet wherein a series of paperboard sections are formed with legs thereon and then secured in sliding assembly together.

Yet another important object of this invention is to provide a new expandable pallet which when expanded and loaded is adapted to flex vertically downwardly at its center area to enable the load to be more uniformly distributed over a top surface of the pallet and to enable plural numbers of packages to be stacked in vertical columns on the pallet.

A further object is to provide a new method of palletizing packages or cartons.

According to still other features of this invention, the

2 pallet is provided with means for preventing twisting of the end sections with respect to the center section comprising interlocked edges.

Yet other features of this invention relate to the provision of teeth and staples or other means for permitting the end sections to be firmly secured within the tube defined in the center section.

Other important features and objects of this invention will more fully become apparent in view of the following detailed description taken in conjunction with the accompanying drawings illustrating several embodiments and in which:

FIGURE 1 is a prespective view of a carton having sliding adjustable pallets on its underside according to important features of the present invention;

FIGURE 2 is a bottom view of one of the pallets with the dotted lines showing the pallet in an expanded position;

FIGURE 3 is an enlarged side elevation of the expandible pallet shown in FIGURE 2;

FIGURE 4 is a plan view of a blank for use in the formation of the middle section of the pallet;

FIGURE 5 is an enlarged vertical section taken substantially on the line V—V looking in the direction indicated by the arrows as shown in FIGURE 2;

FIGURES 6 and 7 are diagrammatic views with the expanded pallet illustrated in an unloaded condition in FIGURE 6 and in a loaded condition in FIGURE 7;

FIGURE 8 is a diagrammatic view illustrating a modified type of pallet with the pallet being shown in an expanded position and in an unloaded condition;

FIGURE 9 is a diagrammatic view of the pallet shown in FIGURE 8 only illustrating the pallet in a loaded condition;

FIGURE 10 is a diagrammatic view of the pallet shown in FIGURE 8 illustrated in a contracted position and in a loaded condition;

FIGURE 11 is a top plan view of still another modified pallet illustrated in a contracted position;

FIGURE 12 is a partially fragmentary top plan view of the pallet shown in FIGURE 11 only illustrated in an expanded position;

FIGURE 13 is a bottom view of the pallet shown in FIGURE 11;

FIGURE 14 is an enlarged fragmentary top plan view illustrating the manner in which inner ends of the end sections are engaged together when in a contracted position;

FIGURE 15 is a fragmentary view similar to FIGURE 12 only illustrating the manner in which the end section is assembled with the center section; and FIGURE 16 is a fragmentary vertical section taken substantially on the line XV—XV looking in the direction indicated by the arrows shown in FIGURE 13.

The reference numeral 5 indicates generally a palletized paperboard carton which includes a cup-shaped bottom 6, rectangular side walls 7 and a cup-shaped cover 8. A series of straps 9 are provided for securing a pair of expandible pallets or pallet units to the underside of the bottom 6 as shown in FIGURE 1. Any suitable number of the expandible pallets may be mounted on the underside of the bottom 6 depending on the size of the carton. Each of the expandible pallets is preferably manufactured from any suitable material such as paperboard of the corrugated type.

The pallet 10 is comprised of three sections including end sections 11 and 12 and a tubular center section 13. The end sections 11 and 12 are identical in construction to one another.

Attached to the underside of the pallet 10 is a series of pallet legs 14 which may be of any suitable type such as shown in my U.S. Patent Nos. 2,507,588 and 2,914,282. If desired, the legs 14 may comprise rectangular paperboard blocks which may be glued to an underside of the pallet 10 as shown in U.S. Patent 2,493,562.

The pallet legs 14 which are illustrated herein are described in detail in the aforesaid patents. Briefly, the legs 14 each include an inner ring 15 and an outer ring 16 which are secured by means of glue with a series of paperboard fingers 17 (FIGURE 4) which are cut from and integral at one end with the particular section to which the leg is being applied. These legs may be of a circular shape or of a parallel sided shape as desired shown in my U.S. Patents 2,507,588 and 2,914,282.

In the manufacture of the center section 13, a blank or strip 13' of paperboard is scored providing sets of score lines as indicated at 19–22, inclusive. The score lines may comprise creases, perforations, and the like and this term has been used in a generic sense herein. By scoring the blank employed for manufacturing the center section 13, the blank is divided into five center blank portions 23–27, inclusive. The leg 14 is attached to the center blank portion 25 by disposing and securing the rings 15 and 16 on radially opposite sides of the fingers 17. The blank is then folded at the score lines 19–22, inclusive and the center flap portions 23 and 27 are secured in lapped engagement together by any suitable means such as glue, rivets, and the like. The center flap portions 23 and 27 are preferably secured together by means of a vegetable type glue which is commonly used in the industry.

The end sections 11 and 12 are formed by cutting relatively flat rectangular paperboard blanks or sheet portions 11a and 12a from a thin sheet of paperboard and the legs 14 are then attached to outer ends 11b and 12b thereof as previously described. The blank including the fingers 17 can be formed in a single die cutting operation.

After the component parts of the pallet have been manufactured, these parts may then be assembled by telescoping inner ends 11c and 12c (FIGURE 2) into opposite ends of rectangular tube 28 defined by the center section 13. When the end sections 11 and 12 are in a closed position, the inner ends 11c and 12c are butt engaged at 29 as shown in FIGURE 2.

The method features of my invention may be carried out by forming the blanks comprising the sections 11, 12 and 13 in the manner set forth above and by attaching the pallet legs 14 to them and then by telescoping the inner ends 11c and 12c of the end sections into the rectangular tube 28 defined by the center section 13.

The carton 9 may then be palletized by disposing the expandible pallets 10 on its underside and by drawing the end sections 11 and 12 out of the center sections so that the length of the pallets will correspond to the length of the carton. These expandible pallets 10 can be secured with the carton by the straps 7, as shown, or by gluing each of the sections 11, 12 and 13 to the bottom 6 of the carton. If desired, the expandible pallets 10 may be assembled with the carton 5 by disposing the expandible pallets on the topside of the carton and then by either gluing or strapping the pallets in the manner described above. The palletized carton 10 may then be inverted to cause the carton to rest on its legs 14.

FIGURE 6 shows the pallet 10 in an expanded position and in an unloaded condition with the pallet leg 14 supporting the pallet on a pallet support surface or plane 30. When the legs are all formed having the same vertical height, the end legs will be slightly spaced above the ground line 30 assuming the slidable portions 11a and 12a of the end sections are relatively stiff and assuming the end sections are balanced on the center section 13. When the pallet 10 is loaded, the load imposed on the center section 13 is transmitted through the end sections 11 and 12 to the end legs 14 resulting in the end legs also being engaged upon the pallet support surface 30 so that the load can be distributed along the length of the pallet 10 when the pallet is in an expanded position and in a loaded condition. It will further be noted that where the legs 14 are of the same vertical height that the top surface 23 of the center section 13 will be disposed in a horizontal plane which is above the planes of the top surface of the end sections. Still further, when the pallet is loaded, as shown in FIGURE 7, the portions 11a and 12a are inclined downwardly in a direction away from the center section 13 due to the semi-flexible nature of paperboard material.

Excellent results may be obtained by manufacturing the pallet 10 so that it has a length of 32 inches when in an unexpanded position and a length of 48 inches when in an expanded position. The length may be varied, as desired, by varying the length of the center section and/or by varying the length of the portions 11a and 12a on the end sections 11 and 12. The pallet 10 can be provided with end sections having a length of 16 inches and a center section having a length of 19 inches. Excellent results may be obtained by cutting the legs so as to have a height of 4¼ inches.

Illustrated in FIGURES 8, 9 and 10 is a modified type of pallet 10' and primed reference numerals have been employed to designate components which are identical to the components already described in connection with the description of the pallet 10. In this instance, the centermost leg 31 is cut so that it is ⅜ inch shorter than the end legs 14' and 14'.

The fiberboard legs 11a', 12a', 23', 24', and 25' are each desirably ⅛ inch thick. When the pallet 10' is in an expanded position but in an unloaded condition, as shown in FIGURE 8, the centermost leg 31 will be spaced from the pallet support surface 30 assuming the end pallet portions 11a' and 12a' are made of semi-rigid material having a strength sufficient to support centermost section 13'.

When the pallet 10' is in an expanded position, but in a loaded condition, as shown in FIGURE 9, the centermost section 13' will be caused to be pressed downwardly so that the centermost leg 31 engages the pallet support surface 30 to distribute the load along the length of the pallet 10'. By cutting the centermost leg so as to be ⅜ inch shorter than the end legs where the pallet has dimensions of the type previously described, the plane of the layer 23' will be disposed in substantially the same plane as the plane of the end sections 11' and 12' at the area of the end sections immediately above the end legs 14'. It will, therefore, be appreciated that the pallet 10' is constructed so that a load mounted thereon may be evenly distributed along the length of the pallet on the legs 14' and 31. The paperboard material has a sufficient flexibility to permit portions 11d' and 12d' of the end sections to flex so as to be inclined when the pallet 10' is in an expanded position and in a loaded condition as shown in FIGURE 9.

The pallet 10' is illustrated in an unexpanded position but in a loaded condition in FIGURE 10. It is significant to note that the center section 13' assumes a longitudinally arched position when loaded causing the shorter middle leg 31 to be engaged against the pallet support surface 30, enabling the load to be more uniformly distributed on the legs 14' and 31. It should further be noted that the fiberboard portions 11d' and 12d' are downwardly inclined in a direction towards one another when the center section 13' is loaded.

In FIGURES 11–15 a modified pallet 40 is illustrated. The pallet 40 includes end sections 41 and 42 as well as a center tubular section 43 which sections are provided with pallet legs 44 and 44' which are identical to the pallet legs 14' and 31 (FIGURES 8–11). For the reasons already discussed, it will be appreciated that the middle leg 44' is preferably shorter than the end legs 44. Insofar as the new features provided on the pallet 40 are concerned, however, it will be appreciated that the legs may all be of the same height, if desired.

The center section 45 is comprised of five center blank portions 45–49 inclusive which may be formed from a blank similar to the one shown in FIGURE 4. The side center blank portion 46 preferably has a greater height than the other side center blank portion 48 to permit the blank portion 45 to be lapped on top of the blank portion 49 in much the same manner as illustrated in FIGURES 4 and 5 where the blank portion 26 has a greater vertical height than the blank portion 24 (FIGURE 5). The sections may be secured together by any suitable means such as glue and the like to form a tube 50.

The end sections 41 and 42 include flat paperboard portions 41a and 42a having inner ends 41c and 42c which are slidable within the tube 50. When the end sections are disposed in an expanded position, as illustrated in FIGURE 12, suitable means such as glue, wire stitching, staples and the like may be provided as indicated at 15 for securing the end sections in a fixed expanded position with respect to the center section 43.

The end sections 41 and 42 are further provided with angled or beveled lead-in edges 41d, 41d and 42d, 42d, as illustrated in FIGURE 14. When the end sections are to be assembled with the center section 43, as shown in FIGURE 15, the lead-in edges enable the flat paperboard portions 41a and 42a to be readily guided into the tube 50 defined by the center section 43. By providing the end sections with lead-in edges of the type described, the end sections may be more rapidly assembled with the center section.

The end sections 41 and 42 are further provided with means for resisting torsional twisting of the end sections with respect to one another when the end sections are in contracted assembly with the center section 43. As illustrated, the means comprises meshed undulated or Z-shaped angled edges 41e and 42e. The outer legs of the undulated edges 41e and 42e merge with the lead-in edges 41d and 42d provided at opposite sides of the paperboard end portions 41c and 42c. It will be appreciated that when the edges 41e and 42e are meshed in engagement together, that these edges provide means for strengthening the pallet against forces which tend to cause longitudinal bending and torsional twisting of the pallet.

In order to insure that the end sections 41 and 42 will be securely engaged within the tube 50, the end sections are provided with teeth 41f and 42f on marginal edges thereof. These teeth are adapted to engage with the center blank portions 46 and 48 in frictional assembly to insure a snug fit with the center section 43. Excellent results may be obtained where six teeth are provided along each inch of edge length on the end sections.

According to important method features of this invention, the edges 41d, 42d, 41e, 42e, 41f and 42f are preferably formed at the time when the end section blanks 41a and 42a are die cut thereby enabling the thin flat paperboard portions of the end sections to be formed in a press operation. It will further be appreciated that the end sections 41 and 42 are identical so that only a single die is needed to cut out the rectangular paperboard portions 41a and 42a. It is in this way that the manufacturing cost of the pallet may be reduced.

The use of the staples 51 is an optional feature which may or may not be employed depending upon the circumstances under which the pallet is to be used. Where it is likely that the pallet when in an expanded position will be knocked around on loading platforms or the like, then excellent results may be obtained by positively anchoring the end sections with the center section to resist detachment of the sections with respect to one another.

It is further contemplated that the sections can be mounted on an underside of a package where the inner end portions 41c and 42c are disengaged from within the tube 50 and totally disengaged from the center section 43. In such case, the pallet sections 41, 42 and 43 would be individually secured to the package by suitable means such as steel straps, glue, or the like. The components of the pallet 40 would only be used in this manner where the package to be palletized was of an over-all size greater than the length of the pallet 41 in an expanded position. It is in this manner that the sliding adjustable pallet 40 as well as the other pallets disclosed herein can be conveniently used on packages having a length substantially greater than the length of the pallet itself when the pallet is in an expanded position with the inner ends 41c and 41d engaged within the center section 43 as shown in FIGURE 12.

In view of the foregoing, it will be appreciated how I have developed a new technique for palletizing packages whereby a pallet can be expanded or reduced in length in accordance with the length of the package to be palletized and whereby the pallet can be employed on packages having a length substantially greater than the length of the pallet where the pallet sections are separated from one another and separately attached to the bottom of the package to be palletized.

It will be understood that modifications and variations may be effected without departing from the scope of the novel concepts of the present invention.

I claim as my invention:

1. An expandible pallet comprised of three paperboard sections with a center-most of said sections being tubular and with end-most of said sections slidingly engaged within opposite ends of the tube defined by said tubular section, the center-most section comprising a strip having opposite ends disposed in lapped relation, means securing said opposite ends in lapped assembly, the end-most sections being slidingly movable in the tube for varying the length of the pallet for attachment with different sized articles to be palletized, and pallet legs mounted on each of said sections at a bottom side of the pallet.

2. An expandible pallet comprised of three paperboard sections with a center-most of said sections being tubular and with end-most of said sections slidingly engaged within opposite ends of the tube defined by said tubular section, the center-most section comprising a strip having opposite ends disposed in lapped relation, means securing said opposite ends in lapped assembly, said end-most sections having confronting ends butt engaged in said tube when said end sections are in a closed unexpanded position, the end-most sections being slidingly movable in the tube away from one another for varying the length of the pallet for attachment with different sized articles to be palletized, and pallet legs mounted on said sections at a bottom side of the pallet.

3. An expandible pallet which has a substantially greater length as compared to its width and being comprised of three relative flat paperboard sections with a center-most of said sections being a rectangular flat tube and with end-most of said sections slidingly engaged within opposite ends of the rectangular tube defined by said tubular section, the center-most section comprising a strip having opposite ends disposed in lapped relation, means securing said opposite ends in lapped assembly, the end-most sections being slidingly movable in the tube for varying the length of the pallet for attachment with different sized articles to be palletized, and pallet legs mounted on said sections at a bottom side of the pallet.

4. An expandible paperboard pallet including end and center sections with the center section comprising a tube having an inner end of each of said end sections telescoped in sliding assembly therein, the center-most section comprising a strip having opposite ends disposed in lapped relation, means securing said opposite ends in lapped assembly, and pallet legs attached with undersides of said sections and with the pallet legs being joined with said outer ends of end sections.

5. In a palletized carton, the improvement of a series of expandible pallet units having means securing said units in spaced assembly with an underside of the carton, each of said pallet units comprising three paperboard sections with a center-most of said sections being tubular and with end-most of said sections slidingly engaged within the tube defined by said tubular section, the center-most section comprising a strip having opposite ends disposed in lapped relation, means securing said opposite ends in lapped assembly, the end-most sections being slidingly movable in opposite ends of the tube for varying the length of the pallet unit, and pallet legs mounted on said sections at a bottom side of the unit.

6. In a palletized carton, the improvement of a series of expandible pallet units having means securing said units in spaced assembly with an underside of the carton, each of said pallet units comprising three paperboard sections with a center-most of said sections being tubular and with end-most of said sections slidingly engaged within the tube defined by said tubular section, the center-most section comprising a strip having opposite ends disposed in lapped relation, means securing said opposite ends in lapped assembly, the end-most sections being slidingly movable in opposite ends of the tube for varying the length of the pallet unit, and pallet legs mounted on said sections at a bottom side of the unit, said legs each comprising annularly arranged fingers struck-out and turned from one of said paperboard sections and with a pair of annular members secured with said fingers with one of said annular members being secured with an inner side of said annularly arranged fingers and with another of said rings secured with an outer side of said fingers.

7. An expandible pallet which has a substantially greater length as compared to its width and being comprised of three relative flat paperboard sections with a center-most of said sections being a rectangular flat tube and with end-most of said sections slidingly engaged within opposite ends of the rectangular tube defined by said tubular section, the center-most section comprising a strip having opposite ends disposed in lapped relation, means securing said opposite ends in lapped assembly, the end-most sections being slidingly movable in the tube for varying the length of the pallet for attachment with different sized articles to be palletized, and pallet legs mounted on said sections at a bottom side of the pallet, said legs each comprising annularly arranged fingers struck-out and turned from one of said paperboard sections and with a pair of annular members secured with said fingers with one of said annular members being secured with an inner side of said annularly arranged fingers and with another of said rings secured with an outer side of said fingers.

8. In a method of manufacturing an expandible paperboard pallet comprising the steps of
forming a pair of end sections and a center blank from paperboard stock,
forming a series of tubular paperboard legs,
attaching the legs to the end sections and the center blank,
folding opposite margins of the center blank into lapped relation forming a tubular center section, and engaging the end sections in opposite ends of the tube defined by the tubular center section.

9. In a method of manufacturing an expandible paperboard pallet comprising the steps of
forming a pair of end sections and a center blank from paperboard stock,
forming a series of tubular paperboard legs with one of the legs being shorter than the other legs,
attaching the legs to the end sections and attaching the shorter leg to the center blank,
folding opposite margins of the center blank into lapped relation forming a tubular center section, and engaging the end sections in opposite ends of the tube defined by the tubular center section.

10. An expandible paperboard pallet comprised of a pair of end sections and a center section having means securing the end sections in slidable assembly with the center section and pallet legs with one of the legs being shorter than the other of the legs mounted on one side of said sections with said sections each having one of said legs secured in assembly therewith and with the shorter pallet leg being secured to said center section.

11. An expandible paperboard pallet comprised of a pair of end sections and a center section having means securing the end sections in slidable assembly with the center section and pallet legs with one of the legs being shorter than the other of the legs mounted on one side of said sections with said sections each having one of said legs secured in assembly therewith and with the shorter pallet leg being secured to said center section, the shorter pallet leg being disengaged from a pallet support surface when said end sections are in an expanded position with respect to said center section and in an unloaded condition.

12. An expandible paperboard pallet comprised of a pair of end sections and a center section having means securing the end sections in slidable assembly with the center section and pallet legs with one of the legs being shorter than the other of the legs mounted on one side of said sections with said sections each having one of said legs secured in assembly therewith and with the shorter pallet leg being secured to said center section, the shorter pallet leg being disengaged from a pallet support surface when said end sections are in an expanded position with respect to said center section and in an unloaded condition, said end sections having deflectable portions enabling said center sections to drop vertically when the expanded pallet is loaded for engaging the shorter center leg with a pallet support surface.

13. An expandible paperboard pallet comprised of a pair of end sections and a center section having means securing the end sections in slidable assembly with the center section and pallet legs with one of the legs being shorter than the other of the legs mounted on one side of said sections with said sections each having one of said legs secured in assembly therewith and with the shorter pallet leg being secured to said center section, said center section being longitudinally arched when the pallet is in an unexpanded position and in a loaded condition for engaging the shorter center pallet leg with a pallet support surface.

14. An expandible pallet comprised of three paperboard sections with a center-most of said sections being tubular and with end-most of said sections slidingly engaged within opposite ends of the tube defined by said tubular section, the end-most sections being slidingly movable in the tube for varying the length of the pallet for attachment with different sized articles to be palletized, and pallet legs mounted on each of said sections at a bottom side of the pallet, said end sections having marginal edges provided with teeth engageable with an inside surface area of the center-most section defining said tube for holding the end sections against accidental detachment from said centermost section.

15. An expandible paperboard pallet comprised of a pair of end sections and a center section having means securing the end sections in slidable assembly with the center section and pallet legs with one of the legs being shorter than the other of the legs mounted on one side of said sections with said sections each having one of said legs secured in assembly therewith and with the shorter pallet leg being secured to said center section, the shorter leg being engageable with a ground surface when the pallet is loaded, said end sections having marginal edges provided with teeth engageable with an inside surface area of the center-most section defining said tube for holding the end sections against accidental detachment from said center-most section.

16. An expandible paperboard pallet including end and center sections with the center section comprising a tube having an inner end of each of said end sections telescoped in sliding assembly therein, and pallet legs attached with undersides of said sections and with the pallet legs being joined with said outer ends of end sections, said end sections having angled lead-in edges at inner ends thereof for aiding in the assembly of the end sections with the center section.

17. An expandible pallet comprised of three paperboard sections with a center-most of said sections being tubular and with end-most of said sections slidingly engaged within opposite ends of the tube defined by said tubular section, the end-most sections being slidingly movable in the tube for varying the length of the pallet for attachment with different sized articles to be palletized, and pallet legs mounted on each of said sections at a bottom side of the pallet, said end sections having marginal edges provided with teeth engageable with an inside surface area of the center-most section defining said tube for holding the end sections against accidental detachment from said center-most section, said end sections having angled lead-in edges at inner ends thereof for aiding in the assembly of the end sections with the center section.

18. An expandible paperboard pallet including end and center sections with the center section comprising a tube having an inner end of each of said end sections telescoped in sliding assembly therein, and pallet legs attached with undersides of said sections and with the pallet legs being joined with said outer ends of end sections, said end sections having undulated inner edges engageable in meshed relation when the end sections are disposed in endwise abutment together within the center section for resisting torsional twisting and longitudinal bending.

19. In a method of manufacturing an expandible paperboard pallet having legs on its underside comprising the steps of
forming a pair of end sections with teeth along marginal edges and a center blank from paperboard stock,
forming the center blank into a center section defining a tube having a transverse dimension approximating a transverse distance between the outer ends of the teeth on opposite marginal edges of each end section, and
engaging the end sections in opposite ends of the tube as well as engaging the teeth with surfaces of the tube holding the end sections therein.

20. In a method of manufacturing an expandible pallet comprising the steps of
forming a pair of end sections and a tubular center blank,
forming a series of legs with one of the legs being shorter than the other legs,
attaching the legs to the end sections and attaching the shorter leg to the tubular center blank, and
engaging the end sections in opposite ends of the tube defined by the tubular center section.

21. An expandible pallet comprised of series of longitudinally slidable sections with at least one of said sections being tubular and with at least another one of said sections having an end telescoped inside of a tube defined by the tubular one of said sections, said tube being comprised of a folded sheet having ends disposed in lapped relation, means securing the ends in lapped relation, and pallet legs mounted on an underside of said sections.

22. The pallet of claim 21 further characterized by said sections being three in number and with a centermost of said sections being tubular.

23. An expandible pallet comprising a series of sections having means permitting the sections to be slid longitudinally with respect to one another into relative contracted and expanded positions, and pallet legs mounted on one side of said sections, a centermost of said sections being tubular and having inner ends of other of said sections telescoped in opposite ends of a tube designed by the tubular centermost section, the leg on the centermost section being shorter than the other pallet legs.

24. In a method of manufacturing an expandible pallet, the steps of
forming a series of sections including at least one tubular section and at least one relatively flat section from sheet stock with the at least one flat section having a transverse dimension no greater than a transverse dimension of a tube provided by the at least one tubular section,
the at least one tubular section being formed by scoring sheet stock and folding and securing the same in tubular form,
attaching pallet legs to said sections on one side thereof, and
securing the tubular and flat sections in telescoped assembly together.

25. In a palletized carton, the improvement of a series of expandible pallet units having means securing said units in spaced assembly with an underside of the carton, each of said pallet units comprising three sections, each of said sections being comprised of a strip of paperboard with a center-most of said sections being tubular and with end-most of said sections slidingly engaged within the tube defined by said tubular section, the paperboard strip comprising the centermost of said sections and being provided with longitudinally extending transversely spaced fold lines and with opposite longitudinally extending margins secured in lapped assembly, the end-most sections being slidingly movable in opposite ends of the tube for varying the length of the pallet unit, and pallet legs mounted on said sections at a bottom side of the unit, said legs each comprising annularly arranged fingers struck-out and turned from one of said paperboard sections and with a pair of annular members secured with said fingers with one of said annular members being secured with an inner side of said annularly arranged fingers and with another of said rings secured with an outer side of said fingers.

26. An expandible pallet which has a substantially greater length as compared to its width and being comprised of three relative flat sections, each of said sections being comprised of a strip of paperboard with a centermost of said sections being a rectangular flat tube and with end-most of said sections slidingly engaged within opposite ends of the rectangular tube defined by said tubular section, the paperboard strip comprising the center-most of said sections and being provided with longitudinally extending transversely spaced fold lines and with opposite longitudinally extending margins secured in lapped assembly, the end-most sections being slidingly movable in the tube for varying the length of the pallet for attachment with different sized articles to be palletized, and pallet legs mounted on said sections at a bottom side of the pallet, said legs each comprising annularly arranged fingers struck-out and turned from one of said paperboard sections and with a pair of annular members secured with said fingers with one of said annular members being secured with an inner side of said annularly arranged fingers and with another of said rings secured with an outer side of said fingers.

27. An expandible pallet which has a substantially greater length as compared to its width and being comprised of three relatively flat paperboard sections with at least one of said sections comprising a sheet of paperboard having spaced sets of parallel score lines, the sheet of paperboard being folded at the score lines providing a rectangular flat tube and with at least one other of said sections being slidingly engaged within an end of the rectangular tube defined by said tubular section, the score lines being positioned on the sheet to provide a flat tube defined by relatively narrow vertical side blank portions joined at one end by a main blank portion and at an opposite end by a pair of lapped blank portions, means joining said lapped blank portions in lapped assembly, the sections being slidingly movable for varying the length of the pallet for attachment with different sized articles to be palletized, and pallet legs mounted on said sections at a bottom side of the pallet.

28. An expandible pallet which has a substantially greater length as compared to its width and being comprised of three relatively flat paperboard sections with at least one of said sections comprising a sheet of paperboard having spaced sets of parallel score lines, the sheet of paperboard being folded at the score lines providing a rectangular flat tube and with other of said sections each comprising a relatively flat strip of paperboard which are slidingly engaged within opposite ends of the rectangular tube defined by said tubular section, the score lines being positioned on the sheet to provide a flat tube defined by relatively narrow vertical blank portions joined at one end by a main blank portion and at an opposite end by a pair of lapped blank portions, means joining said lapped blank portions in lapped assembly, the width of the main blank portion being several times the height of the narrow vertical blank portions, the sections being slidingly movable for varying the length of the pallet for attachment with different sized articles to be palletized, and pallet legs mounted on said sections at a bottom side of the pallet.

29. An expandible pallet which has a substantially greater length as compared to its width and being comprised of three relatively flat paperboard sections with at least one of said sections comprising a sheet of paperboard having spaced sets of parallel score lines, the sheet of paperboard being folded at the score lines providing a rectangular flat tube and with at least one other of said sections comprising a relatively flat strip of paperboard slidingly engaged within an end of the rectangular tube defined by said tubular section, the flat tube having a width at least several times its height, the sections being slidingly movable relative to one another for varying the length of the pallet for attachment with different sized articles to be palletized, and pallet legs mounted on said sections at a bottom side of the pallet.

30. An expandible pallet which has a substantially greater length as compared to its width and being comprised of three relatively flat paperboard sections with at least one of said sections comprising a sheet of paperboard having spaced sets of parallel score lines, the sheet of paperboard being folded at the score lines providing a rectangular flat tube and with at least one other of said sections being slidingly engaged within an end of the rectangular tube defined by said tubular section, the flat tube having a width at least several times its height, the sections being slidingly movable relative to one another for varying the length of the pallet for attachment with different sized articles to be palletized, and pallet legs mounted on said sections at a bottom side of the pallet.

31. The pallet of claim 30 further characterized by a center-most of said sections comprising said flat tube and said other sections comprising end sections.

32. The pallet of claim 31 further characterized by said leg mounted on said center-most section supporting said legs mounted on said end sections out of ground contact and with the legs attached to said end sections being engageable with a ground surface upon being loaded.

33. The pallet of claim 31 further characterized by said legs mounted on said end sections supporting said leg on said center-most section out of ground contact but with said center-most leg being movable into ground contact upon being loaded.

34. The pallet of claim 30 further characterized by said end sections having inner undulated ends engageable in nested relation when engaged to resist torsional twisting.

35. An expandible pallet which has a substantially greater length as compared to its width and being comprised of three relatively flat paperboard sections with at least one of said sections comprising a sheet of paperboard having spaced sets of parallel score lines, the sheet of paperboard being folded at the score lines providing a rectangular flat tube and with at least one other of said sections being slidingly engaged within an end of the rectangular tube defined by said tubular section, the flat tube having a width at least several times its height, the sections being slidingly movable relative to one another for varying the length of the pallet for attachment with different sized articles to be palletized, and pallet legs mounted on said sections at a bottom side of the pallet, at least one other of said sections having teeth along its opposite side edges for engagement with sides of the rectangular flat tube to resist accidental displacement.

36. An expandible pallet which has a substantially greater length as compared to its width and being comprised of three relatively flat paperboard sections with at least one of said sections comprising a sheet of paperboard having spaced sets of parallel score lines, the sheet of paperboard being folded at the score lines providing a rectangular flat tube and with at least one other of said sections being slidingly engaged within an end of the rectangular tube defined by said tubular section, the flat tube having a width at least several times its height, the sections being slidingly movable relative to one another for varying the length of the pallet for attachment with different sized articles to be palletized, and pallet legs mounted on said sections at a bottom side of the pallet, said pallet legs having varying heights for more uniformly distributing the load being palletized.

37. An expandible pallet comprised of three relatively flat paperboard sections with at least one of said sections comprising a sheet of paperboard having spaced sets of parallel score lines, the sheet of paperboard being folded at the score lines providing a parallel sided tube and with at least one other of said sections being comprised of paperboard and being slidingly engaged within an end of the parallel sided tube defined by said tubular section, said parallel sided tube having lapped ends, means securing said lapped ends in lapped assembly, the sections being slidingly movable relative to one another for varying the length of the pallet for attachment with different sized articles to be palletized, and pallet legs mounted on said sections at a bottom side of the pallet.

References Cited by the Examiner

UNITED STATES PATENTS

| | | | |
|---|---|---|---|
| 1,774,268 | 8/1930 | Harding | 108—65 |
| 2,261,314 | 11/1941 | Vogel | 120—36 |
| 2,377,911 | 6/1945 | Warren | 108—54 |
| 2,556,611 | 6/1951 | Borgman | 182—223 X |
| 2,594,287 | 4/1952 | Budd | 108—53 X |
| 2,604,982 | 7/1952 | Cibie | 220—8 |
| 2,628,715 | 2/1953 | Budd | 108—51 X |
| 2,675,936 | 4/1954 | Ridge | 108—58 X |
| 2,739,776 | 3/1956 | Terando | 108—54 |
| 2,852,785 | 9/1958 | Mikola | 182—223 X |
| 2,873,934 | 2/1959 | Settles | 108—54 |
| 2,909,349 | 10/1959 | Morris | 108—54 |
| 2,942,827 | 6/1960 | Edson | 108—54 |
| 3,053,598 | 9/1962 | Cheslow | 108—64 |

FRANK B. SHERRY, Primary Examiner.

G. O. FINCH, Assistant Examiner.